United States Patent [19]

Klose

[11] 4,453,730

[45] Jun. 12, 1984

[54] BICYCLE FRAME

[76] Inventor: Odo Klose, Am Freudenberg 19, 5600 Wuppertal 1, Fed. Rep. of Germany

[21] Appl. No.: 322,338

[22] Filed: Nov. 18, 1981

[30] Foreign Application Priority Data

Nov. 21, 1980 [DE] Fed. Rep. of Germany ....... 3043931
Oct. 31, 1981 [EP] European Pat. Off. ......... 81109470.5

[51] Int. Cl.³ .............................................. B62K 3/04
[52] U.S. Cl. .................. 280/281 R; 280/274
[58] Field of Search ......................... 280/281, 274, 283

[56] References Cited

U.S. PATENT DOCUMENTS 595,148 12/1897 Cobb ................................ 180/281 R
4,129,317 12/1978 Bell ................................ 180/281 R

FOREIGN PATENT DOCUMENTS 872372 6/1942 France ............................ 280/281 R
224334 2/1943 Switzerland .................... 280/281 R
611866 11/1948 United Kingdom ............ 280/281 R

*Primary Examiner*—Joseph F. Peters, Jr.
*Assistant Examiner*—Donn McGiehan
*Attorney, Agent, or Firm*—Martin A. Farber

[57] ABSTRACT

A bicycle frame bent in approximately the shape of a parabola with the parabola vertex in the region of the steering fork head, the frame being stabilized by the ends of the parabolic frame arms are tensioned with respect to each other in opposition to their elastic movement of restoration by a bridge which extends from the rear wheel fork to the saddle mount.

13 Claims, 7 Drawing Figures

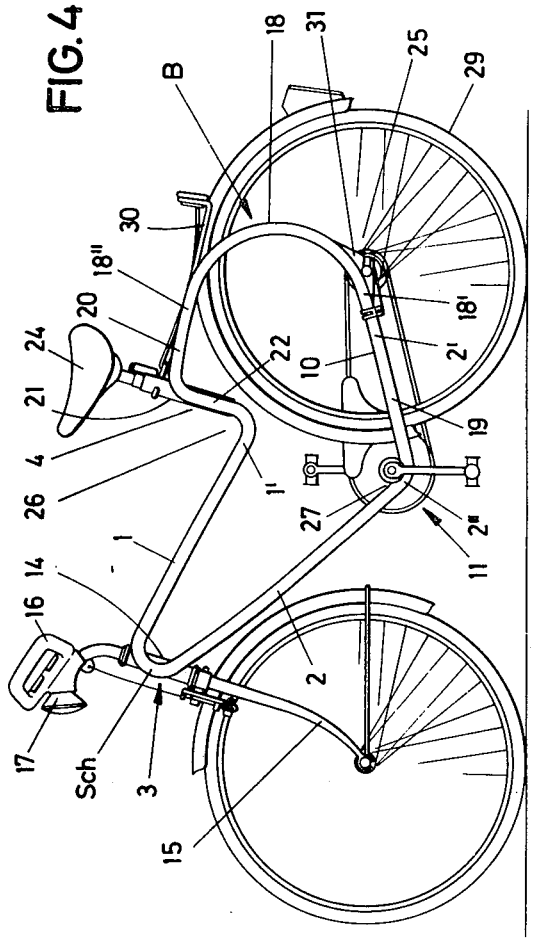
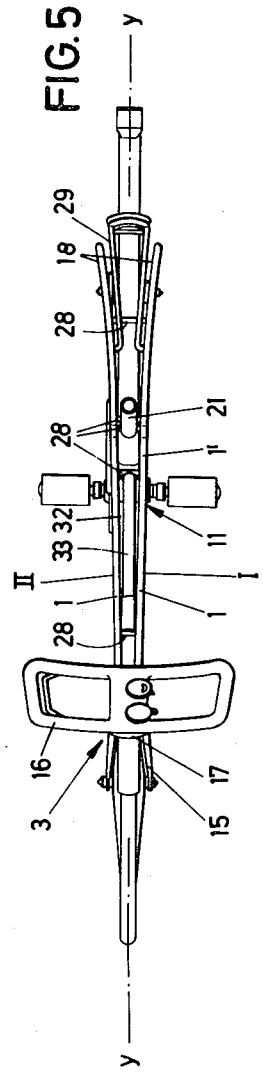

BICYCLE FRAME

The present invention relates to a bicycle frame having an upper frame arm extending rearward from the steering fork head towards the saddle mount and a lower frame arm extending from the steering fork downward in the direction towards the pedal bracket and rear wheel fork.

In conventional frame construction, the individual frame-forming arms are welded together, generally with the use of lugs which reinforce the junction points. Despite certain possibilities of automation, this type of manufacture is expensive. Furthermore, such bicycle frames are of substantial weight, due not least of all to a tubular stay which supports the frame from the inside and leads from the saddle mount to the pedal bracket.

The object of the present invention is to develop a bicycle frame of this type in a structural shape, which is simple to manufacture, in such a manner that weight-increasing measures can be dispensed with while retaining high stability of the frame, and for which it is even possible to use lighter materials.

This object is achieved by a frame structure wherein the upper and lower frame arms (1, 2) are of parabolic shape with a parabola vertex (Sch) arranged in the region of the steering fork head (3), the free ends (1', 2') of the frame arms (1, 2) being held tensioned with respect to each other in opposition to their flexural elastic restoration force by a bridge (B) which extends from the region of the saddle mount (4) towards the end of the rear wheel fork (10).

As a result of this development there is created a highly stable bicycle frame of easy manufacture. It is based on a basic body of parabolic shape. Its ends, which are pulled towards each other and form the upper and lower frame arms, respectively, are held tensioned with respect to each other, in opposition to the flexurally elastic restoring force of the frame arms, by the bridge, which forms practically a chord. This results in a considerable moment of stability. Lighter material can be used along with a further reduced cross section of the frame arms. This is of great importance, in particular, for racing bicycles. The parabola vertex which is in itself practically neutral as to resiliency forms the steering fork head. The bridge consists advantageously of a U-shaped yoke which participates in forming the wheel channel. Its vertex region is articulated to the rear of the saddle bracket so that, upon the bracing, the necessary play for alignment of the yoke is present. The ends of the arms of the yoke are attached to the prong ends of the rear wheel fork. With respect to the development of the steering fork head it is advantageous for it to lie as a secant to the vertex of the parabola. The corresponding vertex-intersecting development can be realized in a bushed hole in the vertex region which is thickened here. Due to the fact that the parabola vertex furthermore is surrounded by a geometrically similarly shaped yoke section of the steering fork, the region of articulation of the fork is substantially removed from direct view. In addition, the steering fork is in itself stabilized. The lengthening of the fork by this yoke section also leads to another articulation point at the steering fork prong which emerges on top.

The additional object of further developing the bicycle frame in such a manner that the bridge is integrated into the total frame, while retaining the above-described advantageous basic development of the frame, is served by the measure that the bridge is shaped as a bow (18) which has its vertex directed towards the rear, and whose radius of curvature is curved, in opposition to its flexural-elastic force of restoration in the direction of a reduction of the radius of curvature.

As a result of this development, the bridge is now formed by a lengthened portion of the frame itself, and is no longer present as a chord-like section developed as a separate part directly between the pedal bracket and the saddle mount; rather, the bridge is formed as a bow having its vertex directed rearwardly. The bow forms a second bracing region in addition to the bracing region of the parabolic zone already present. After a possible exceeding of the total bracing force this even results in an advantageous resilient zone in the region of the saddle mount. Hard jolts are taken up and compensated for better by the frame itself. Further more, the rearward direction of the bow provides an advantageous possibility of attaching a luggage carrier pointing towards the rear. In this way a better provision is obtained for the equipping of touring bicycles.

For the frame one can start from a cut length of tube. The lower frame arm advantageously continues in one piece into the bow; the other end of the bow in the region of the saddle mount is rigidly connected with the upper end of the frame by an intermediate piece which extends in the direction of the saddle bar. This section, due to the relatively closely adjacent transitions into the parabola-shaped basic body on the one hand and into the rearwardly directed bow on the other hand constitutes practically a zone of neutral movement. Therefore no bending forces of importance are transmitted to the saddle bar. A total of three such frame sections forming zones of neutral flexure are obtained, distributed substantially uniformly over the periphery of the frame, namely the parabola vertex, the saddle-bar region and the pedal bracket region. Due to the fact that the intermediate piece together with the end sections of the upper frame arm and of the bow forms an approximately Z-shaped course, there is obtained a frame shape which is closer to a lady's bicycle in which the upper frame arm extends pronouncedly downwardly. The bicycle is in this way easier to mount. Due to the fact that, furthermore, the lower frame arm forms a downwardly directed bend in the region of the pedal bracket, not only is the above-described stiffening zone obtained but at the same time there is also created an inner throat for the wheel bearing bushing, which throat is favorable for purposes of attachment. In addition, a third bracing region is obtained. Due to the structural measure that the frame consists of two individual frames arranged alongside of each other and connected to each other by spacer members, even higher bracing forces can be used with reduced tube cross-section. Despite congruent individual frames which are arranged closely alongside each other, the necessary room for attachment of the rear wheel is created in simple fashion in the manner that the distance between the two individual frames increases towards the rear frame end. The conditions for producing the bracing force of the frame can be optimized by imparting to the frame tube an elliptical or oval cross section, with the shorter axis of the ellipse transverse to the plane of the frame.

Other advantages and details of the object of the invention are explained in further detail below with reference to illustrative embodiments shown in the drawing, in which FIG. 1 is a perspective view of a bicycle having the bicycle frame developed in the manner of the invention, in accordance with the first embodiment;

FIG. 4 shows a bicycle having a bicycle frame developed in the manner of the invention, in accordance with the second embodiment;

FIG. 5 is a top view thereof;

Figure 1:
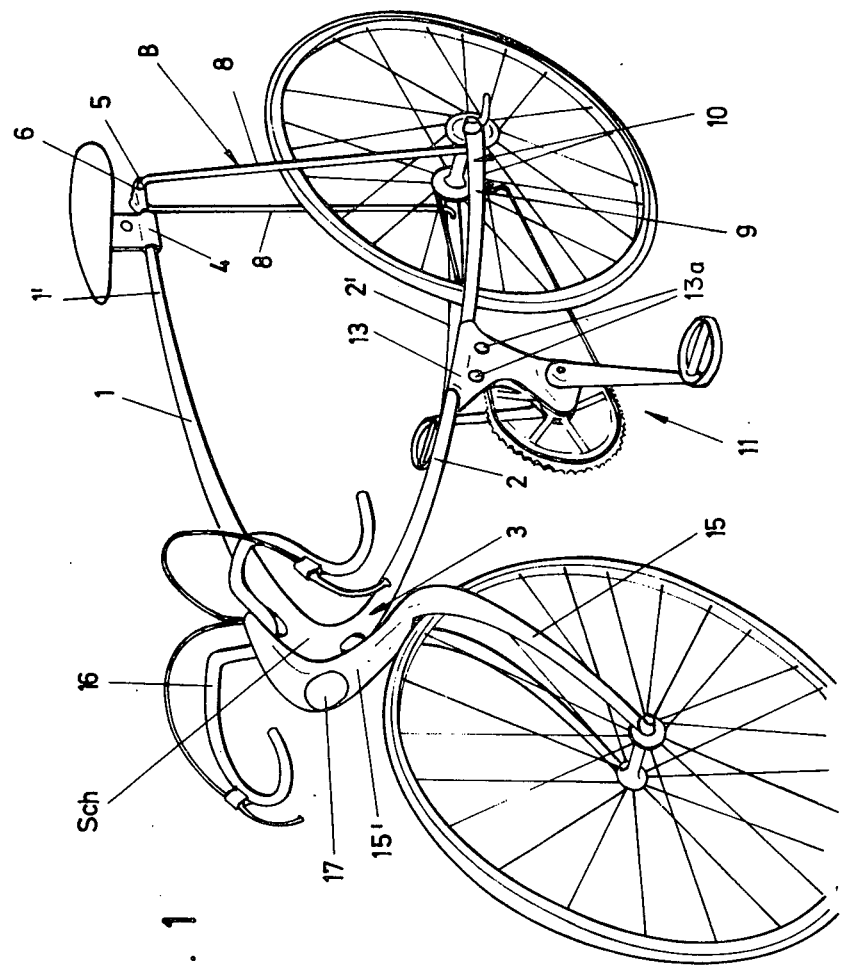

The bicycle frame, which is formed in one piece of an upper frame arm and a lower frame arm, is bent into the shape of a parabola. The vertex of the parabola Sch lies in the region of the steering fork head 3. This vertex region is thicker than the cross section of the frame arms 1, 2 and is thus stiffened.

The frame arms 1,2 which, on the other hand, are capable of springing apart are tensioned with respect to each other in opposition to their flexural (bending)-elastic restoring force in the manner of an archery bow. This tensioned position is secured by a bridge B which forms the chord. The bridge is connected to the free ends 1',2' of the frame arms 1, 2. In the form of construction shown in FIGS. 1 and 2, the bridge is developed in the form of a separate part. It is a U-shaped yoke. Its vertex region is connected at the rear to a saddle mount 4 which is arranged on the free end 1' of the upper frame arm 1. There is involved here an articulated attachment utilizing the web 5 of the yoke. The lug 6 which receives the web is open in clamp-like manner at the end. After mounting, a fastening screw 7 is inserted, which presses the jaws of the clamp against each other.

The yoke arm ends 8' of the U-yoke arms 8, which ends are bent off in the direction of the central plane, are seated on prongs 9 of the rear wheel fork 10 which are produced by splitting the lower frame arm. The corresponding articulation of the yoke arm ends 8' is also pivotally movable. The ends of the yoke arm ends 8' are thickened in the manner of rivet heads in order to prevent withdrawal. The pedal bracket 11 adjoins the rear wheel fork 10 on the side of the steering-fork head. The pedal bracket is seated in a U-strap 12 (FIG. 2) which grips over the top of the lower frame arm. The fastening means are not shown in detail. Screws can be used. In the development shown in FIG. 1, the pedal bracket 11 continues upward into a clamp 13 which surrounds the frame arm and is secured by a pair of fastening screws 13a.

Figure 2:
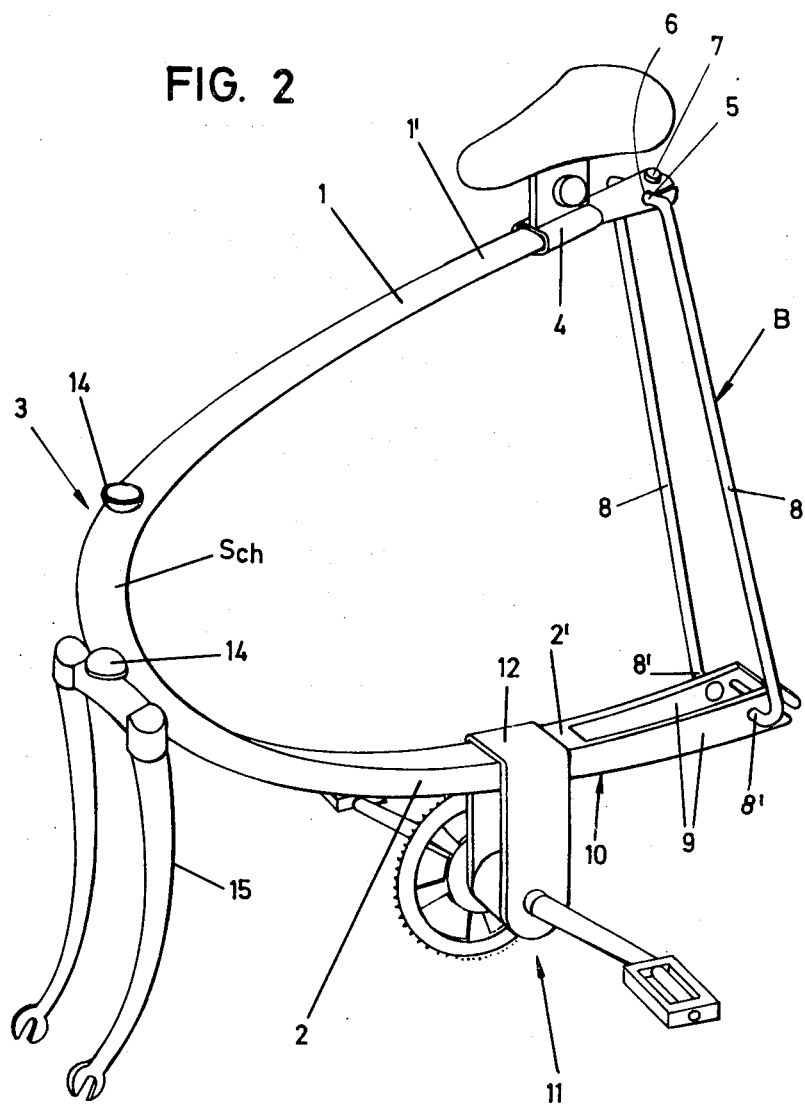
FIG. 2 is a perspective view of a modified part of the bicycle frame.
Figure 3:
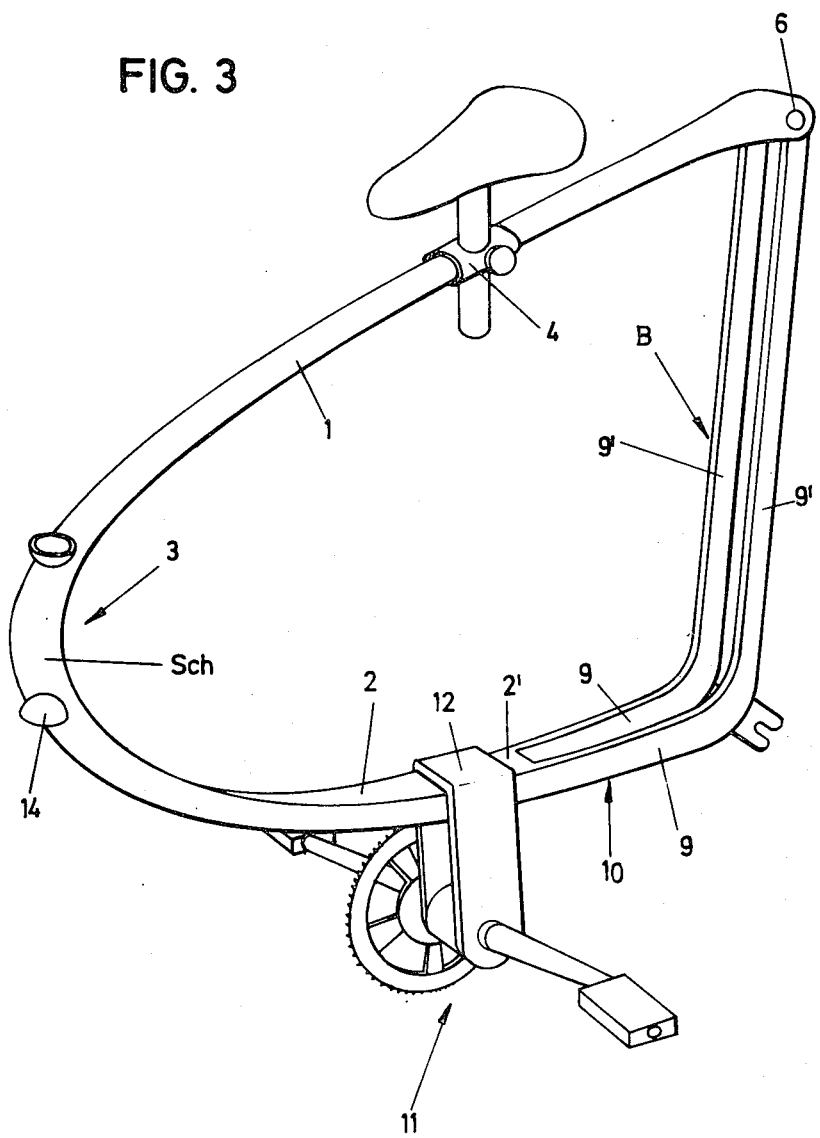
FIG. 3 is a modified structural shape of the bridge, also shown in perspective.

In accordance with the construction shown in FIG. 3 the bridge B is developed as a chord-like extension of the rear wheel fork 10 or prongs 9 and is made of a single piece with the lower frame arm 2. The extensions corresponding to the U-arms 8 of the structural shape shown in FIG. 2, which are fixed in the region of the saddle mount 4, are designated 9'. Their free ends form lugs 6 for the passage of a fastening screw corresponding to the web 5.

The steering fork head 3 is located in secant-fashion to the vertex Sch of the parabola. The correspondingly thickened vertex region is drilled through and possibly lined with a bearing bushing 14 which extends beyond the surface of the frame arm. The bushing receives the fork steering pin (not shown in detail) of a steering fork 15. Such a bearing bushing 14 is advisable particularly in the case of hollow bicycle frames. However, it can also be used if the bicycle frame consists of solid material, such as, for instance, synthetic resin reinforced with fiberglass. In any event, such a bearing bushing also contributes to stiffening the support for the fork steering pin so that this zone is not pulled into a form-changing tensioning force.

The fork steering pin passes at the top into a support for a bicycle handlebar 16.

As can be noted from FIG. 1, the steering fork 15 is extended upward, i.e. above the base of the fork. This section of the yoke is designated 15'. It is of geometrically similar shape to the parabola vertex Sch and protrudes beyond the latter in such a manner that free steering is not impeded. The end of the yoke section 15' can furthermore be connected with the handlebar mount or the fork steering pin so as to result in an extremely stable steering-fork arrangement. As a result of the exposed, i.e. protruding, arrangement of this yoke section 15' and due to its sufficient width it can be used for the countersunk provision of a bicycle headlight housing 17.

The parabolically curved bicycle frame section in accordance with the second embodiment (FIG. 4) also has an upper and a lower frame section 1 and 2 respectively and corresponds in its basic construction to the first embodiment. The reference numbers have been transferred accordingly. The springable frame arms 1,2 are clamped tensioned with respect to each other, in opposition to their flexurally elastic restoring force in the manner of an archery bow, for example, with a force of about 40 kg. This tensioned position is assured by a bridge B forming the chord. The tensioning direction is substantially vertical. This bridge B is developed as a bow 18 which has its vertex (apex) directed towards the rear. The curving region of the bow 18 is also bent, in opposition to its flexurally elastic restoring force, in the direction towards a reduction in the radius of curvature (for instance also with a force of about 40 kg) and acts on the free ends 1', 2' of the frame arms 1, 2. In this case also the direction of tensioning is vertical.

Figure 6:
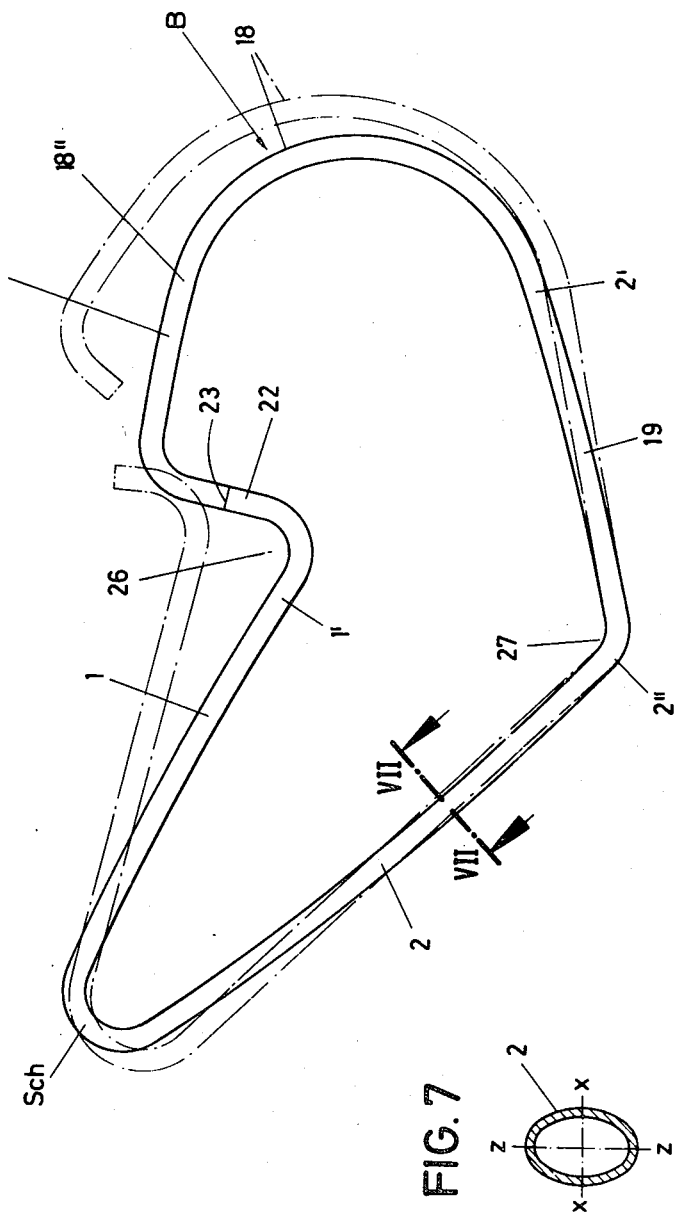
FIG. 6 is a detail view of the frame with simultaneous indication of the relaxed basic shape.

The frame, which thus has two main tensioning regions can be formed, as shown in FIG. 6, in one piece from a cut length of tube, the lower frame arm 2 continuing in the region of a pedal bracket 11 into an obliquely upward-directed bend 19 which passes into one end 18' of the bow 18. The other end 18" of the bow 18 is rigidly connected to the upper frame arm 1 in the region of a saddle mount 4 by an intermediate piece 22 which extends in the direction of the saddle mounting bar 21. A saddle 24 is mounted on the latter. The transitions to the intermediate piece 22 are in each case sharply bent. Frame arm 2 and bend 19 form an obtuse V frame section as a third approximately horizontally directed tensioning region (see FIG. 6, dot-dash lines showing plastic deformation). The V arm is designated 2".

The connection point 23 lies in the region of the intermediate piece 22.

The bridge B which acts in this manner on the parabolic bicycle-frame section is less a chord which is rigid in itself, as in the case of the first embodiment, than a flexible bridge. Sudden loads which are introducted via the saddle 24 are therefore resiliently taken up after the threshold value has been exceeded, i.e. the value of elastic deformation.

Together with the end of the upper frame arm 1' and the bow 18 or, more precisely the section 20 of the bow, the intermediate piece 22 forms a Z-shaped course. The Z arm formed by the section 20 is slightly curved upward. The Z web 22, as the intermediate piece, points downward in the direction of the pedal bracket 11; the upper frame arm 1 which extends from the fork head 3, points substantially in the direction towards the rear-wheel support 25 of the rear-wheel fork 10. The throat-like depression 26 in the bicycle frame which is formed thereby facilitates mounting the bicycle.

A throat 27 produced on the lower frame arm 2 and formed by a narrow rounding of this section receives the pedal bracket 11; this throat provides a favorable orientation for assembly when the pedal bracket bushing is fastened together by spacers 28. The bearing bushing 14 also assumes a similar function for the steering fork 15.

As can be noted from FIG. 5, the distance between the two individual frames I, II (each as discussed above) increases towards the rear end of the frames to an extent which permits the introduction of the rear wheel 29. The spacer 28 which lies in the rear end of the frame in the region of the bridge supports a freely rearward extending luggage carrier 30 which is formed of a U-shaped yoke, the ends of which are connected rigidly, or possibly also pivotally, to the inner sides of the individual frames I, II. The attachment ends are bent outwards in opposite directions. Luggage securing means can be associated with the luggage carrier 30.

The rear wheel axle receiver is developed as a flanged plate 31 welded onto the lower, ground-side end of the bow 18 and is provided with the corresponding insertion slot for the wheel axle there.

Figure 7:
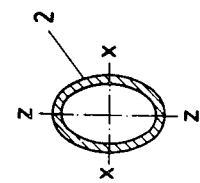
FIG. 7 is a section along the line VII—VII of FIG. 6.

As material for the frame, a tube is used whose elliptical or oval cross section is shown in FIG. 7.

When forming the frame one starts out with the shorter axis of the ellipse X—X extending transverse to the plane Y—Y of the frame.

This plane at the same time forms the axis of symmetry of the bicycle.

The distance between the individual frames I, II is maintained at such a value at the front that an air pump 33 can still be inserted into the intervening space 32. This pump is thereby located in a manner protected from impact, particularly as the longer axis Z—Z of the ellipse corresponds approximately to the diameter of the tubular pump housing. The spacers 28 can be arranged there in such a manner that they serve as a pump mounting.

The fork steering pin passes at the top into a mount for a frame-shaped bicycle handlebar 16. The form of frame which can be particularly noted from FIG. 5 provides three different possibilities of grasping it, namely on the one hand on the two parallel longitudinal arms of the frame and on the other hand on the shorter frame arms which are directed substantially in the direction of travel. The bicycle handlebar 16 also receives the customary functional elements such as bell, gear shift device, brake handle as well as an integrated bicycle headlight housing 17.

I claim:

1. A bicycle frame comprising
   two congruent individual frames connected with each other and disposed at a distance from each other,
   each of said individual frames including:
   an upper frame arm extending, from a first portion thereof adapted for a steering fork head of a bicycle, in rearward downward direction to a second portion thereof adapted for a seat mount of the bicycle;
   a lower frame arm extending from the first portion in a downward direction to a third portion thereof adapted for a pedal bracket of the bicycle, said lower frame arm from the third portion continues into a backwardly rising bend of the lower frame arm;
   said bend together with said lower frame arm forms an obtuse V frame section;
   a rearward end zone of said bend of said lower frame arm forms a fourth portion thereof adapted for a rear wheel axle receiver of the bicycle and extends into an upwardly rising section, the latter extending into the region of the second portion for the seat mount;
   said rearward end zone of said bend extends into said upwardly rising section forming a bow, the latter having a rearwardly directed apex; and
   an intermediate piece rigidly connects said upwardly rising section in the region of the second portion with said upper frame arm;
   a seat mounting bar,
   said intermediate pieces of said two congruent individual frames hold said seat mounting bar of the bicycle therebetween and are aligned the same as said seat mounting bar, and are directed substantially toward but spaced apart from said third portion, and
   said seat mounting bar extends substantially only the length of said intermediate pieces.

2. The bicycle frame according to claim 1, wherein said first portion forms a parabola vertex portion, and the steering fork head is disposed as a secant to the parabola vertex portion.

3. The bicycle frame according to claim 1, wherein said upper and lower frame arms are formed in one-piece.

4. The bicycle frame according to claim 1, wherein said bow constitutes a one-piece bent extension from said lower and upper frame arms.

5. The bicycle frame according to claim 1, wherein said bow has a curving region bent, in opposition to a bending elastic restoration force thereof, in a direction of a reduction in the radius-of-curvature of the curving region.

6. The bicycle frame according to claim 5, wherein said seat mount is mounted on said seat mounting bar, the rearward end zone of said bend of said lower frame arm is continued into said bow at one end of the bow, and
the other end of the bow is rigidly connected to the upper frame arm in the region of the seat mount by said intermediate piece.

7. The bicycle frame according to claim 6, wherein the intermediate piece forms an ly Z-shaped course with the end of the upper frame arm and said other end of the bow.

8. The bicycle frame according to claim 5, wherein the two congruent individual said frames lie alongside of each other,
spacers connect said individual frames with each other, the distance between said individual frames increasing towards the rear end.

9. The bicycle frame according to claim 5, wherein said individual frames each defines substantially a plane, said frames comprise a frame tube of elliptical cross section, a shorter axis of the ellipse is transverse to the plane of the frames, respectively.

10. The bicycle frame according to claim 5, wherein said individual frames each defines substantially a plane, said frames comprise a frame tube of oval cross section, a shorter axis of the oval is transverse to the plane of the frames, respectively.

11. The bicycle frame according to claim 1, wherein said bow is stressed.

12. The bicycle frame according to claim 1, wherein said intermediate pieces and said seat mounting bar are substrantially vertical slightly inclined rearwardly in an upward direction.

13. In a bicycle frame comprising an upper frame arm extending in a rearward direction from a steering fork head towards a saddle mount and a lower frame arm extending in a downward direction from the steering fork head in a direction towards a pedal bracket and a rear wheel fork, the improvement wherein the upper and lower frame arms together substantially have the shape of a parabola with a parabola vertex thereof arranged in the vicinity of the steering fork head, the frame arms defining ends constituting ends of the parabola, a bridge extending from a vicinity of the saddle mount towards an end of the rear wheel fork, said bridge comprises means for stressing said ends with respect to each other in opposition to their flexural elastic restoration force effected thereby, the steering fork head is disposed as a secant to the parabola vertex, and a steering fork includes a yoke section of the steering fork, said yoke section is of geometrical shape similar to that of said parabola vertex and surrounds the latter.

* * * * *